(12) United States Patent
Turtinen et al.

(10) Patent No.: US 8,611,913 B2
(45) Date of Patent: Dec. 17, 2013

(54) RESOURCE UTILIZATION IN WIRELESS NETWORKS

(75) Inventors: Samuli Turtinen, Ii (FI); Sami-Jukka Hakola, Kempele (FI); Timo K. Koskela, Oulu (FI); Matti Pikkarainen, Oulu (FI); Ville Vartiainen, Oulu (FI)

(73) Assignee: Broadcom Corporation, Irvine, CA (US)

( * ) Notice: Subject to any disclaimer, the term of this patent is extended or adjusted under 35 U.S.C. 154(b) by 43 days.

(21) Appl. No.: 13/331,225

(22) Filed: Dec. 20, 2011

(65) Prior Publication Data

US 2013/0157669 A1    Jun. 20, 2013

(30) Foreign Application Priority Data

Dec. 16, 2011    (GB) .................................. 1121665.2

(51) Int. Cl.
*H04W 24/00*    (2009.01)

(52) U.S. Cl.
USPC .......................................... 455/450; 370/311

(58) Field of Classification Search
USPC ............ 455/436, 422.1, 435.1, 450; 370/311, 370/328, 335
See application file for complete search history.

(56) References Cited

U.S. PATENT DOCUMENTS

2008/0220791 A1* 9/2008 Cho et al. ....................... 455/450
2011/0280223 A1* 11/2011 Maeda et al. .................. 370/335

FOREIGN PATENT DOCUMENTS

EP    2378703 A1    10/2011

OTHER PUBLICATIONS

"3rd Generation Partnership Project; Technical Specification Group Radio Access Network; Evolved Universal terrestrial Radio Access (E-UTRA); Physical layer procedures (Release 10)", 3GPP TS 36.213 V10.0.1, Dec. 2010, 98 pgs.
"On the need for a 3GPP study on LTE device-to-device discovery and communication", Qualcomm Incorporated, 3GPP TSG-RAN #52, RP-110706, May-Jun. 2011, 2 pgs.
"Study on LTE Device to Device Discovery and Communication—Radio Aspects", TSG-RAN #52, RP-110707, May-Jun. 2011, 7 pgs.
"Study on LTE Device to Device Discovery and Communication—Service and System Aspects", TSG-RAN #52, RP110708, May-Jun. 2011, 7 pgs.
"Transmission Timing Offset Broadcasting for Ranging in Femtocells", Pei-Kai Liao et al., IEEE C802.16m-10/0500, Apr. 30, 2010, 14 pgs.

* cited by examiner

*Primary Examiner* — Phuoc H Doan
(74) *Attorney, Agent, or Firm* — Stanton IP Law

(57) ABSTRACT

Downlink common control information communicated in a first network (such as a macro network or a small cell) between a first/macro access node and a user equipment UE is mapped to an uplink resource. The first/macro access node and UE then tune to the mapped uplink resource to send or receive dedicated control information about the UE concerning a second network (an underlay network such as a femto CSG or D2D network). In one embodiment the DCI may be within a downlink assignment indicated by P-RNTI, RA-RNTI, or SI-RNTI; and the mapping uses a control channel element which carries the P-RNTI or the RA-RNTI or the SI-RNTI. In another the mapped uplink resource is a format 1*a* or format 1*b* PUCCH and the common control information requires neither an acknowledgement nor a negative acknowledgement. The dedicated control information may inform about interference experienced by the UE with the second network.

22 Claims, 4 Drawing Sheets

RESOURCE UTILIZATION IN WIRELESS NETWORKS

TECHNICAL FIELD

The exemplary and non-limiting embodiments of this invention relate generally to wireless communication systems, methods, devices and computer programs, and more specifically relate to uplink reporting of dedicated control information such as D2D or interference information, and mapping to resources for such reporting.

BACKGROUND

The following abbreviations that may be found in the specification and/or the drawing figures are defined as follows:
  3GPP third generation partnership project
  ABS almost blank subframes
  ACK acknowledgement
  CCE control channel element
  CSG closed subscriber group
  D2D device-to-device
  DCI downlink control information
  eICIC enhanced inter cell interference coordination
  eNB evolved Node B
  HARQ hybrid automatic repeat request
  NACK negative acknowledgement
  PDCCH physical downlink control channel
  PDSCH physical downlink shared channel
  PUCCH physical uplink control channel
  RAR random access response
  RNTI radio network temporary identifier
  RRC radio resource control
  TA timing advance
  UE user equipment The radio environment has become more complex as different systems overlap and the need has arisen to coordinate among them for smart-phones and other types of user equipments which communicate on multiple systems at once. Traditional hierarchical cellular arrangements are generically termed a macro network or macro cell, and within or near that macro cell is one or more other radio sub-environments such as a femto cell (operating what is sometimes termed an underlay network) or device-to-device communications. Such overlapping networks are often referred to as heterogeneous networks. The available radio spectrum is most efficiently employed when there is some coordination among these different radio networks.

FIG. 1 is a schematic diagram of such a heterogeneous network. There is a UE 20 in communication with a macro eNB 22 in a conventional cellular arrangement. Nearby is a femto eNB 26 which is assumed to operate on at least some of the same frequency bands as the macro eNB 22, and/or is another UE#2 with which the first UE 20 is engaging in D2D communications directly. Currently it is assumed the best effective management of this radio environment centers on the macro eNB 22, for it can coordinate its transmissions so as not to interfere with the lower transmit power of the femto eNB 26 and can allocate specific radio resources for the UEs to use for their D2D communications. The end goal is to avoid interference as much as practical between the conventional cellular communications on link 21, communications with the femto eNB 26 on link 23, and the D2D communications on link 27.

LTE Release 10 (LTE-A) has introduced a mechanism to mitigate interference between links 21 and 23, termed enhanced inter-cell interference coordination eICIC. In this technique the macro eNB 22 and the femto eNB 26 coordinate to avoid interfering transmissions. Specifically, the macro eNB 22 will restrict itself in certain identified almost-blank subframes (ABS) to transmit nothing except the common reference signals used for measurements (and in some cases also essential control information like synchronization, paging, or system information) but never any unicast DL user data. During these ABSs transmissions by the femto eNB 26 are 'protected' in that transmissions from the macro eNB with its greater transmit power will not interfere with the lower power femto eNB transmissions. If UE 20 is not attached to the femto eNB 26 it can measure the common reference signal which the macro eNB 22 transmits in the ABS and report its radio link measurement to the macro eNB 22 for mobility purposes.

As to the D2D link 27, Qualcomm, Inc. has proposed evolving the LTE platform in order to intercept the demand of proximity-based applications by studying enhancements to the LTE radio layers that allow devices to discover each other directly over the air, and potentially communicate directly. See for example documents Tdoc-RP-110706 entitled ON THE NEED FOR A 3GPP STUDY ON LTE DEVICE-TO-DEVICE DISCOVERY AND COMMUNICATION; Tdoc-RP-110707 entitled STUDY ON LTE DEVICE TO DEVICE DISCOVERY AND COMMUNICATION—RADIO ASPECTS; and Tdoc-RP-110708 entitled STUDY ON LTE DEVICE TO DEVICE DISCOVERY AND COMMUNICATION—SERVICE AND SYSTEM ASPECTS (all from 3GPP TSG-RAN Meeting #52 plenary; Bratislava, Slovakia; 31 May-3 Jun. 2011) [1-3]. These proposals include a radio level discovery functionality, which needs also to be coupled with a system architecture and a security architecture that allow the 3GPP operators to retain control of the UE behavior (for example, to control who can emit discovery signals, when and where, what information these signals should carry, and what actions the corresponding UEs should take once they discover each other).

Basics of the eICIC concept are outlined above and these have also been discussed extensively for RRC-IDLE mode UEs in past 3GPP sessions, including where the idle mode UE 20 roams near to a femto cell 26 which is a closed subscriber group CSG cell for which this particular UE 20 does not have access and so is not allowed to initiate communication towards that CSG cell 26. FIG. 1 illustrates this with a one-way femto link 23; the UE 20 is forced to communicate with the overlaying macro cell 22, despite that it may experience severe interference from the CSG cell 26 or initiate the inter frequency measurements for cell re-selection purposes. It is not yet resolved how the UE 20 in RRC IDLE mode could inform the macro cell 22 about the situation of severe interference as early as possible when initiating communication towards that macro cell 22. Once the macro cell 22 was aware of the interference issue it could protect the UE 20 using the ABSs of the femto cell 26, but until then the UE 20 will suffer interference between links 21 and 23.

SUMMARY

The foregoing and other problems are overcome, and other advantages are realized, by the use of the exemplary embodiments of this invention.

In a first exemplary embodiment of the invention there is a method comprising: mapping from downlink common control information to an uplink resource, in which the downlink common control information is communicated in a first network between a first access node and a user equipment; and tuning to the mapped uplink resource for one of sending or receiving dedicated control information about the user equipment concerning a second network.

In a second exemplary embodiment of the invention there is an apparatus comprising at least one processor; and at least one memory including computer program code. In this embodiment the at least one memory and the computer program code is configured, with the at least one processor, to cause the apparatus at least to: map from downlink common control information to an uplink resource, in which the downlink common control information is communicated in a first network between a first access node and a user equipment; and tune to the mapped uplink resource for one of sending or receiving dedicated control information about the user equipment concerning a second network.

In a third exemplary embodiment of the invention there is a computer readable memory tangibly storing a computer program that is executable by at least one processor. In this embodiment the computer program comprises: code for mapping from downlink common control information to an uplink resource, in which the downlink common control information is communicated in a first network between a first access node and a user equipment; and code for tuning to the mapped uplink resource for one of sending or receiving dedicated control information about the user equipment concerning a second network.

DETAILED DESCRIPTION

Figure 2:
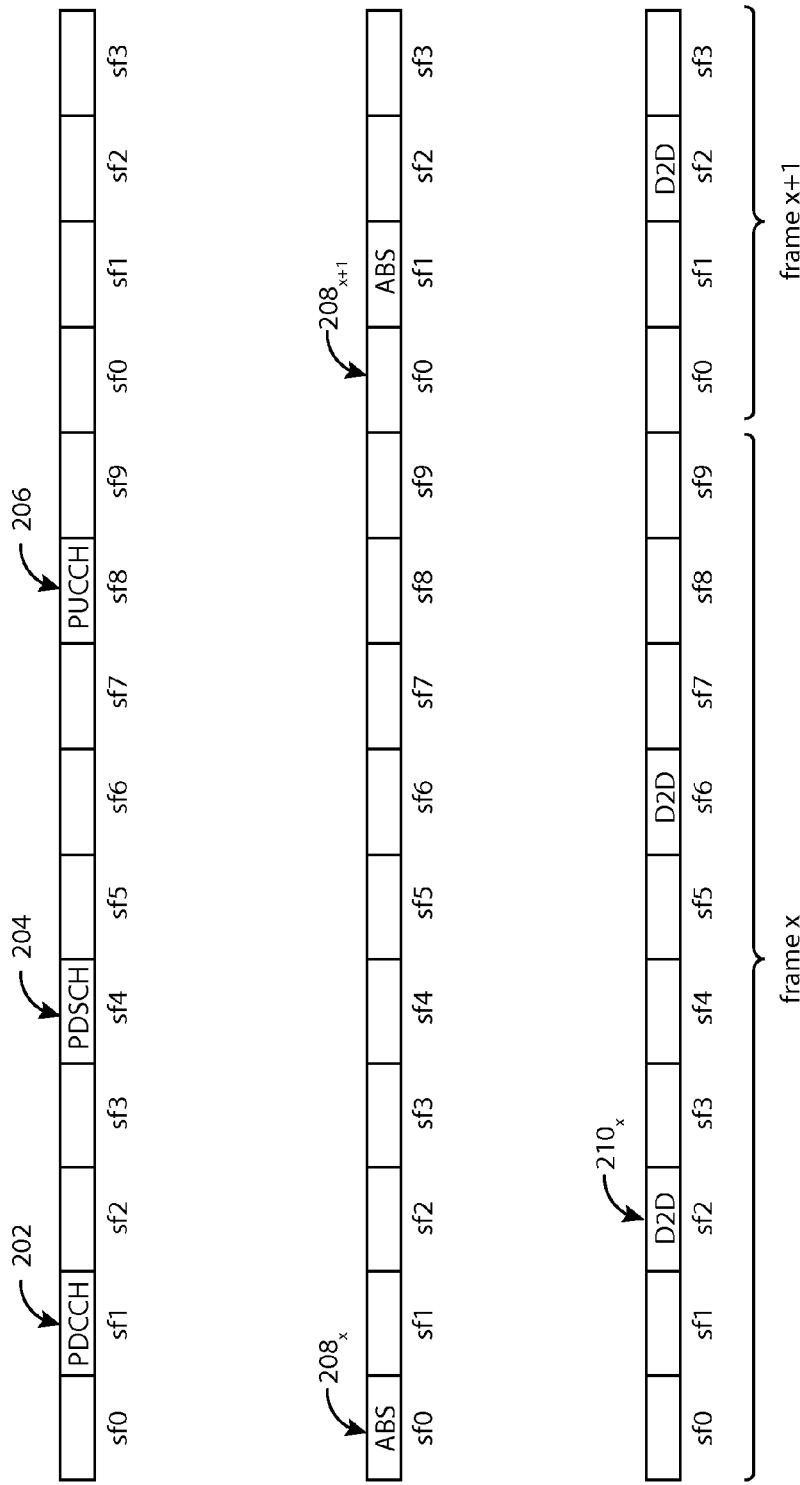
FIG. 2 is a schematic timing diagram of subframes in a radio frame for mapping between radio resources according to exemplary embodiments of these teachings.

FIG. 2 is a timing diagram for an LTE system showing subframes indexed as 0, 1, . . . 9 in frame x and a subset of similar subframes in frame x+1. In conventional LTE the macro eNB 22 sends a PDCCH 202 which allocates UL and/or DL resources to the various UEs addressed by that specific PDCCH 202. In the FIG. 2 example the PDCCH 202 in subframe 1 allocates to the UE 20 a PDSCH 204 in subframe 4. The HARQ arrangement for this aspect of LTE is that the UEs will send their ACK for the PDSCH 204 in a PUCCH 206 spaced four subframes after the PDSCH 204 is received. As shown at the FIG. 2 example, the UE 20 receives in subframe 4 the scheduled PDSCH 204 and sends its ACK for it in a PUCCH 206 in subframe 8. The eNB 22 knows that the PUCCH 206 it receives in subframe 8 refers to the PDSCH 204 it sent in subframe 4, which the eNB 22 itself scheduled via the PDCCH 202 in subframe 1. The specific format 1a or 1b PUCCH 206 in subframe 8 in which the UE 20 is to send its ACK is derived from the lowest control channel element CCE index that was used to construct the original PDCCH 202 (the corresponding DCI assignment) and also a common parameter (n1PUCCH-AN) which is configured for a cell by higher layers.

The eNB 22 also uses the PDCCH 202 to transmit common control information in the LTE macro cell, such as for example system information, paging information, and responses to random access request procedures. These common control information transmissions are not ACK'd by the receiving UEs; they are HARQ-less transmissions. For those DL transmissions of common control information the eNB 22 need not tune to receive on any PUCCH resource an ACK from any UE in conventional LTE The lowest CCE index of those PDCCHs which are used to transmit common control information will map as is detailed above to an uplink resource for a format 1a/1b PUCCH, but conventionally no UE will be sending an ACK on that format 1a/1b PUCCH resource. According to an embodiment of these teachings, that uplink resource which is otherwise unused in the macro network layer is used instead for the UE 20 to send dedicated control information concerning the underlay network to the macro network. Since in prior art LTE iterations the common control information always aggregates either 4 or 8 CCEs this leaves always at least 4 PUCCH resources available which are otherwise unused.

Figure 1:
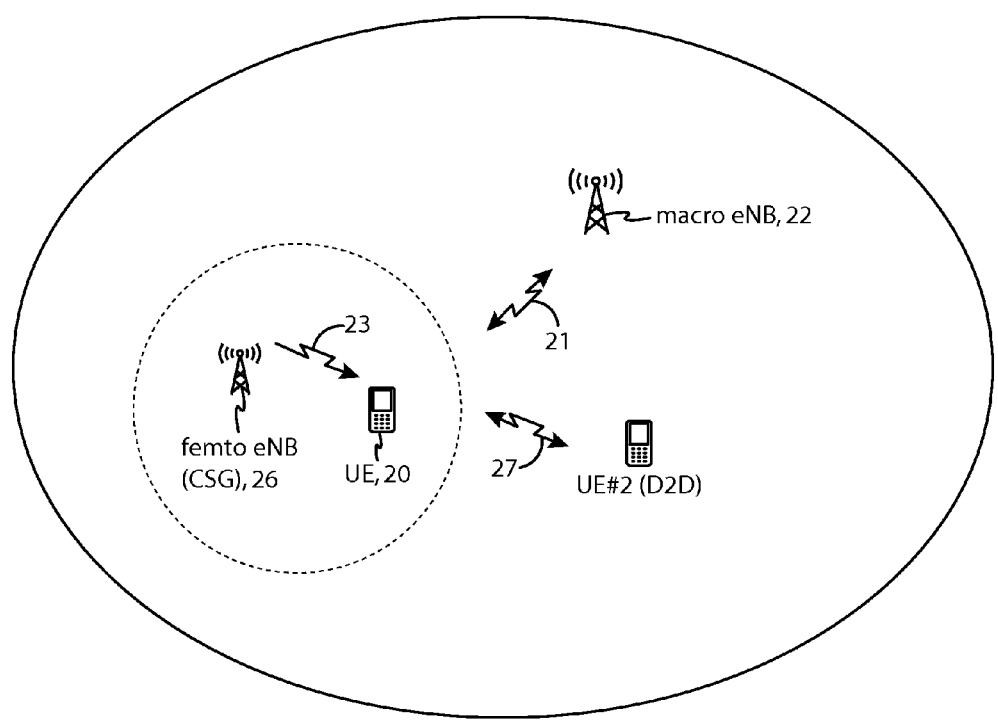
FIG. 1 is a plan view of a conceptual radio environment in which the various exemplary embodiments of these teachings may be practiced to advantage.

FIG. 1 illustrates two different underlay networks; a femto eNB 26 in communication with the subject UE 20, and a D2D network in which the subject UE 20 is communicating directly with another UE#2. Since the macro cell controlled by the macro eNB 22 may in fact be a small cell, more generally the underlay network may be considered a second network in contrast to the macro network which may be considered a first network. In this case then the macro eNB 22 is simply a first eNB or first access node while the femto eNB 26 is a second eNB or second access node. In one embodiment the UE 20 sends to the first/macro eNB 22 on that unused PUCCH resource information about interference it is experiencing from the second/underlay femto network.

For example, assume the femto cell is a CSG and the UE 20 has no access rights to the femto eNB 26, whose eICIC scheme with the macro eNB 22 is for the macro eNB 22 to protect the femto eNB 26 by broadcasting only an ABS $208_x$ and $208_{x+1}$ in subframe 0 of each frame. In this case the femto underlay network is synchronized with the macro network, as is detailed further below. If the UE 20, which is not a member of the femto eNB 26 CSG, was experiencing interference from the underlay network it could report this to the macro network/macro eNB 22 in its PUCCH 206 in subframe 8. For the case in which the UE 20 is in the RRC IDLE mode, this PUCCH might be unused resources that remained free of any corresponding paging message the macro eNB 22 may otherwise transmit to it. This enables the macro eNB 22 to at least identify a UE paging group of this particular UE 20 that is paged in a corresponding paging occasion, and the UE 20 reports it is experiencing a severe interference situation under the non-allowed CSG/femto cell which would then trigger some action on the part of the macro eNB 22 to facilitate the UE's 20 communication setup.

In another embodiment the UE 20 sends to the macro eNB 22 on that unused PUCCH resource 206 information about resources it needs for its D2D communications, such as its D2D buffer status/occupancy. For example, assume the UE 20 is in the RRC-CONNECTED mode and has both (macro) cellular and D2D bearers. The UE 20 could indicate in the unused PUCCH resource 206 soon after it has some new DCI (in the PDCCH 202) certain D2D specific information, such as for example whether it has more data related to the D2D bearer 210, than cellular bearer data in its buffer (taking into account the priorities of the bearers), or more D2D bearer related data in the buffer than some certain pre-determined threshold, or it can indicate the measured interference on the D2D resources 201, allocated to it which is above some predetermined threshold.

In both cases it is assumed the underlay network is synchronized to the macro network. For the case of the femto network one proposal to accomplish this is for the femto eNB 26 to broadcast timing advance TA information towards its macro eNB 22, which the RRC-IDLE mode UE 20 can obtain from the femto eNB's system information even if the femto eNB 26 is a CSG and the UE 20 has no access rights to that femto cell. For the case of the D2D communications it is advantageous that the macro network 22 allocate radio resources on which those D2D communications can occur and so the different devices UE 20 and UE#2 are assumed to be using the same frame/subframe structure as LTE and the same timing as the macro cell 22.

In an exemplary embodiment of these teachings the UE 20 utilizes unused PUCCH format 1*a*/1*b* resources, which in conventional LTE are not used to convey HARQ-ACK/NACK information, to transmit certain dedicated control information such as for example dedicated D2D specific control information or state information for eICIC purposes. As with the above example, in this embodiment the unused PUCCH resources are linked to (mapped from) the common control information scheduled via PDCCH. While the above examples of common control information included system information blocks, paging and random access responses, these are particular for LTE and when implemented in different macro networks there may be different types of common control information in addition to or instead of those three examples.

For embodiments specific to the LTE example above, one PDCCH may map to multiple unused PUCCH resources. The UE 20 acquires the amount of unused PUCCH resources corresponding to that one PDCCH assignment by the amount of allocated CCEs used by the PDCCH assignment. Then the UE 20 uses the one or multiple unused PUCCH resources to transmit certain dedicated control information. In this context the common control information which the macro eNB 22 transmits in the PDCCH is non-specific to the UE 20 and the dedicated control information transmitted by the UE 20 means dedicated or specific to that same UE 20. For the case in which the common control information are paging and random access response assignments, they are indicated by P-RNTI and RA-RNTI respectively and they each will have different corresponding PUCCH resources for the UE 20 to transmit different dedicated control information.

In one embodiment, a particular unused PUCCH resource in the time-frequency domain maps to a certain TC-RNTI (Temporary Cell Radio Network Temporary Identifier) to be used by the macro eNB 22 for transmitting certain information to the UE 20 that exploited the unused PUCCH resource. In this case there is a further mapping between unused PUCCH resources and TC-RNTI values, and this further mapping is a function of a predefined algorithm stored in the local memory of both the UE 20 and the macro eNB 22. In this manner the macro eNB 22 can send its reply to the UE's dedicated control information.

For example, consider that the FIG. 2 example of the PUCCH in subframe 8 maps to a certain value for TC-RNTI according to the predefined algorithm. The macro network/macro eNB 22 will use that TC-RNTI to identify a message it sends downlink to the UE 20 as being the reply to the uplink dedicated control information the UE 20 sent in the PUCCH in subframe 8. There may be a mapping to the downlink resource on which the macro eNB 22 sends that reply, or the macro eNB 22 can simply send it in the next PDCCH to that UE 20 but addressed to the TC-RNTI which the UE 20 is now monitoring rather than the P-RNTI so the UE 20 can know even before decoding that this message is the reply concerning the underlay network rather than new data or scheduling on the overlay network.

In order that the macro eNB 22 need not monitor every one of the unused PUCCH resources, utilization of the unused PUCCH resources can be configured by the macro network/macro eNB 22. Such a configuration may be fixed, semi-persistent, persistent, dynamic, or some other manner of configuration. Any of these configurations may be common for the configured UEs in the cell, specific to only one or multiple UEs in the cell, or common for all UEs in the cell. Or there may be a cell-wide common configuration which the macro eNB 22 can override on a per-UE basis. The macro eNB 22 may configure its UEs to utilize the unused PUCCH resources for dedicated control information via broadcast message, dedicated RRC signaling, scheduling information, or other manners of explicit or implicit signaling.

One technical effect of these teachings is that they enable a new means by which the UE 20 can send some specific D2D information, utilizing an existing LTE uplink control channel. Or for the femto cell environment the technical effect is that it allows a UE in the RRC IDLE mode to indicate to the macro eNB 22 about some severe interference situation the UE has experienced as early in the communication setup phase as possible.

Figure 3:
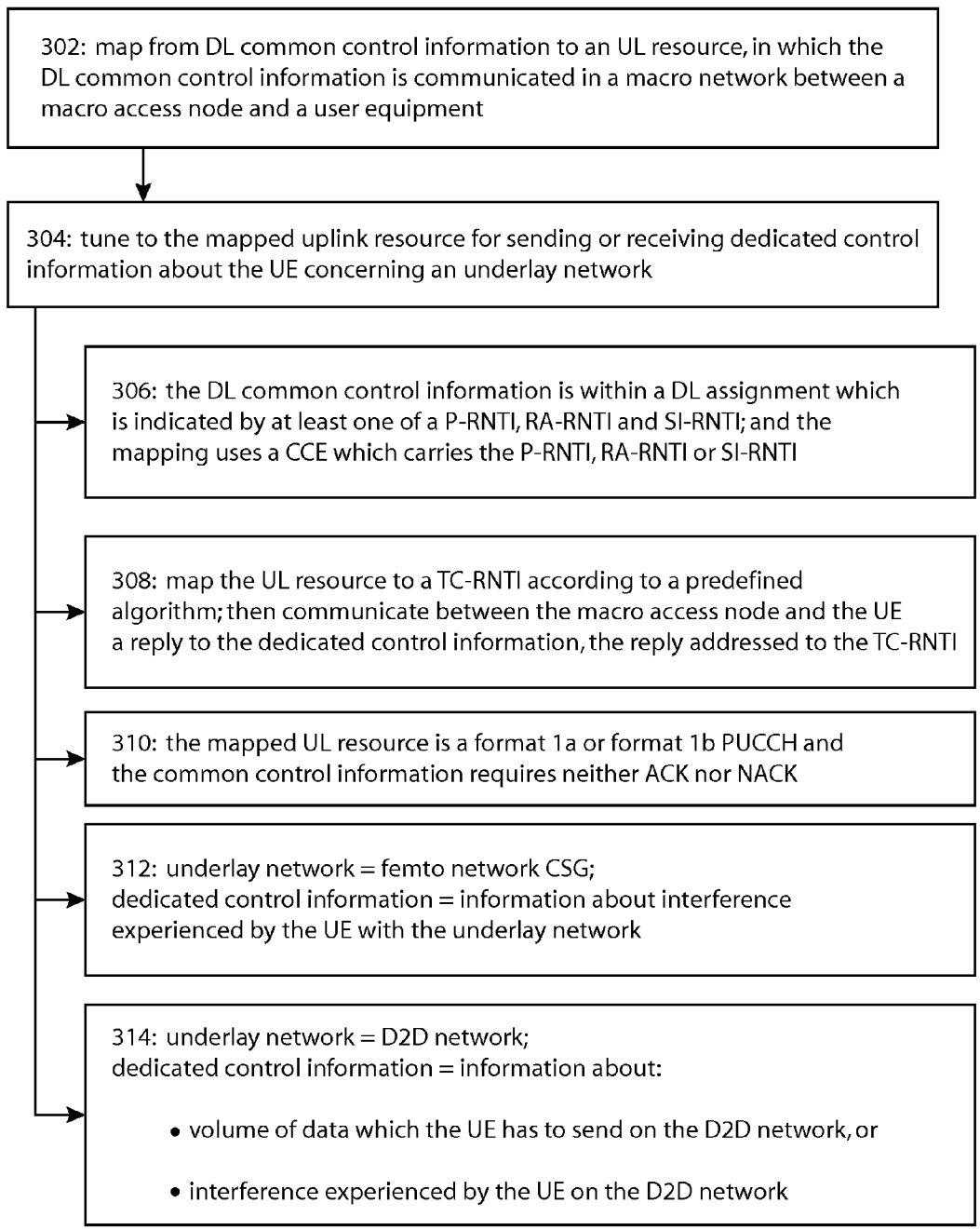
FIG. 3 is a logic flow diagram illustrating the operation of a method, and a result of execution of computer program instructions embodied on a computer readable memory, for practicing exemplary embodiments of these teachings.

FIG. 3 is a logic flow diagram which may be considered to illustrate the operation of a method, and a result of execution of a computer program stored in a computer readable memory, and a specific manner in which components of an electronic device are configured to cause that electronic device to operate. The various blocks shown in each of FIG. 3 may also be considered as a plurality of coupled logic circuit elements constructed to carry out the associated function(s), or specific result of strings of computer program code stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

FIG. 3 details particular exemplary embodiments of the invention from the perspective of either the UE 20 or of the first/macro eNB 22. FIG. 3 may be implemented by the entire UE/eNB or by one or more components thereof, more generally termed an apparatus. At block 302 of FIG. 3 the UE or first/macro eNB maps from downlink common control information to an uplink resource, in which the downlink common control information is communicated in a first/macro network between a first/macro access node 22 and a user equipment 20. Then at block 304 the UE or the first/macro eNB tune their transmitter/receiver to the mapped uplink resource for sending (in the case of the UE 20) or receiving (in the case of the macro eNB 22) dedicated control information about the UE concerning a second network which in the above examples is an underlay network.

Further portions of FIG. 3 are optional and may or may not be combined with one another in various embodiments. Block 306 specifies that the downlink common control information is within a downlink assignment which is indicated by at least one of a paging radio network temporary identifier P-RNTI and a random access radio network temporary identifier RA-RNTI and a system information radio network temporary identifier SI-RNTI; and that the mapping of block 302 uses a control channel element which carries the P-RNTI or the RA-RNTI or the SI-RNTI.

Block 308 specifies the example above concerning the further reply from the network. The UE and the eNB map the uplink resource to a temporary cell radio network temporary identifier TC-RNTI according to a predefined algorithm; and then communicate a reply to the dedicated control information of block 304 in the first/macro network between the first/macro access node and the UE, in which the reply is addressed to the TC-RNTI.

For the LTE specific implementation detailed above block 310 stipulates that the mapped uplink resource of block 302 is a format 1a or format 1b physical uplink control channel PUCCH and the common control information requires neither an acknowledgement nor a negative acknowledgement.

Block 312 gives the femto network as the second/underlay network as shown in FIG. 1 by the dashed line. In the example above for this the femto network was a closed subscriber group network and the dedicated control information of block 304 comprises information about interference experienced by the UE with the second/underlay network. And finally block 314 summarizes the alternative second/underlay network as a D2D network in which the dedicated control information of block 304 comprises information about volume of data which the user equipment has to send on the D2D network (for example; absolute, or compared to a threshold, or compared to how much cellular data volume it has to send), or the information is about interference experienced by the UE on the D2D network.

Figure 4:
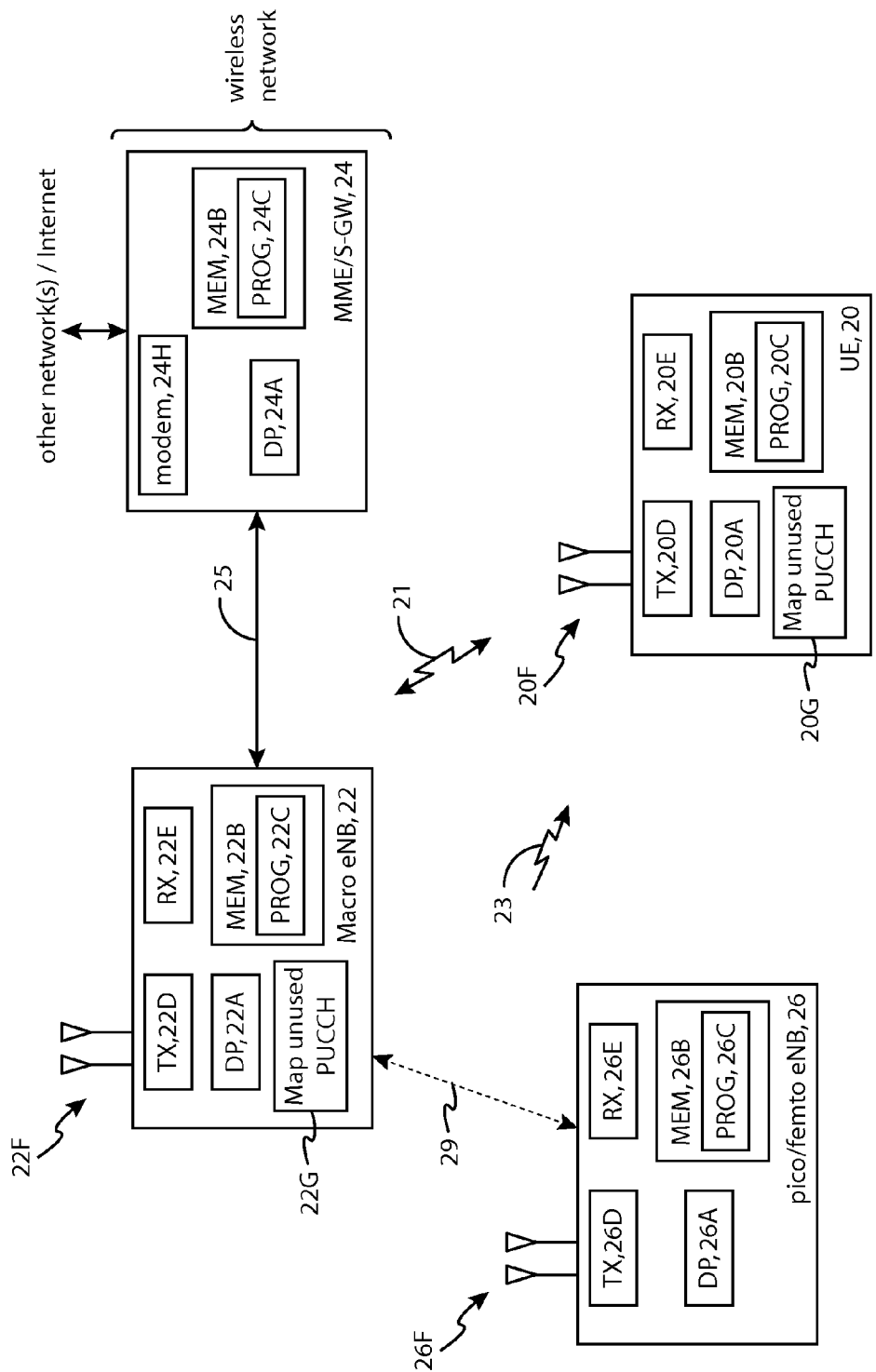
FIG. 4 is a simplified block diagram of some of the devices shown at FIG. 1 which are exemplary electronic devices suitable for use in practicing the exemplary embodiments of this invention.

Reference is now made to FIG. 4 for illustrating a simplified block diagram of various electronic devices and apparatus that are suitable for use in practicing the exemplary embodiments of this invention. In FIG. 4 there is a first/macro network access node/macro eNB 22 coupled via an interface 29 to a second network access node/femto eNB 26 (or a pico eNB), which are adapted for communication over respective wireless links 21, 23 with an apparatus 20 such as mobile terminals or termed more generally as a user equipment UE. The first/macro eNB 22 may be further communicatively coupled via link 25 to further networks (e.g., a publicly switched telephone network PSTN and/or a data communications network/Internet), possibly via a higher network node such as a mobility management entity/serving gateway MME/S-GW 24 in the case of the LTE system. In place of the second/femto eNB 26 may instead be the other UE#2 shown at FIG. 1, in which case the femto link 23 of FIG. 4 is replaced by the bi-directional D2D link 27 shown at FIG. 1.

The UE 20 includes processing means such as at least one data processor (DP) 20A, storing means such as at least one computer-readable memory (MEM) 20B storing at least one computer program (PROG) 20C, communicating means such as a transmitter TX 20D and a receiver RX 20E for bidirectional wireless communications with the macro eNB 22 and with the pico/femto eNB 26 via one or more antennas 20F. Within the memory 20B of the first UE 20 is also a computer program for mapping to the unused PUCCHs or other types of uplink control resources as detailed above in various embodiments.

The first/macro eNB 22 also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with its associated user devices 20 via one or more antennas 22F and a modem. The macro eNB 22 also has stored in its memory at 22G software to also map to unused PUCCH resources as detailed in particular by the above non-limiting examples. The pico/femto eNB 26 (and the other UE#2) is similarly functional with blocks 26A, 26B, 26C, 26D, 26E and 26F.

For completeness the MME/S-GW 24 is also shown to include a DP 24A, and a MEM 24B storing a PROG 24C, and additionally a modem 24H for communicating with at least the first/macro eNB 22. While not particularly illustrated for the UE 20 or eNBs 22, 26, those devices are also assumed to include as part of their wireless communicating means a modem which may in one exemplary but non limiting embodiment be inbuilt on an RF front end chip so as to carry the respective TX 20D/22D/26D and RX 20E/22E/26E.

At least one of the PROGs 20C, 22C, 26C in the UE 20 and in the macro and eNB 22 is assumed to include program instructions that, when executed by the associated DP 20A, 22A, enable the device to operate in accordance with the exemplary embodiments of this invention as detailed more fully above. In this regard the exemplary embodiments of this invention may be implemented at least in part by computer software stored on the MEM 20B, 22B which is executable by the DP 20A, 22A of the respective devices 20, 22; or by hardware; or by a combination of tangibly stored software and hardware (and tangibly stored firmware). Electronic devices implementing these aspects of the invention need not be the entire UE 20, or first/macro eNB 22, but exemplary embodiments may be implemented by one or more components of same such as the above described tangibly stored software, hardware, firmware and DP, or a system on a chip SOC or an application specific integrated circuit ASIC or a digital signal processor DSP or a modem or a subscriber identity module commonly referred to as a SIM card.

Various embodiments of the UE 20 can include, but are not limited to: cellular telephones; data cards, USB dongles, personal portable digital devices having wireless communication capabilities including but not limited to laptop/palmtop/tablet computers, digital cameras and music devices, and Internet appliances.

Various embodiments of the computer readable MEM 20B, 22B, 26B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 20A, 22A, 26A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the LTE and LTE-A systems, it should be appreciated that the exemplary embodiments of this invention are not limited for use with only this one particular type of wireless communication system, and that they may be used to advantage in other wireless communication systems such as for example UTRAN, WCDMA and others as adapted for power saving active/sleep periods for a UE.

Some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. A method, comprising:
mapping from downlink common control information to an uplink resource, in which the downlink common control information is communicated in a first network from a first access node to a user equipment; and
tuning to the mapped uplink resource for one of sending or receiving dedicated control information about the user equipment concerning a second network, in which the first network is a macro network, the first access node is a macro access node, the second network is an underlay network, the downlink common control information is within a downlink assignment which is indicated by at least one of a paging radio network temporary identifier P-RNTI, a random access radio network temporary identifier RA-RNTI, and a system information radio network temporary identifier SI-RNTI; and the mapping uses a control channel element which carries the P-RNTI or the RA-RNTI or the SI-RNTI.

2. The method according to claim 1, in which the mapped uplink resource is a format 1a or format 1b physical uplink control channel PUCCH and the common control information requires neither an acknowledgement nor a negative acknowledgement.

3. The method according to claim 1, in which the second network comprises a closed subscriber group network and the dedicated control information comprises information about interference experienced by the user equipment with the second network.

4. The method according to claim 1, in which the method is executed by the user equipment which receives the downlink common control information from the first access node and which sends to the first access node the dedicated control information about the user equipment concerning the second network.

5. The method according to claim 1, in which the method is executed by the first access node which sends the downlink common control information to the user equipment and which receives from the user equipment the dedicated control information about the user equipment concerning the second network.

6. A method comprising:
mapping from downlink common control information to an uplink resource, in which the downlink common control information is communicated in a first network from a first access node to a user equipment;
tuning to the mapped uplink resource for one of sending or receiving dedicated control information about the user equipment concerning a second network;
mapping the uplink resource to a temporary cell radio network temporary identifier TC-RNTI according to a predefined algorithm; and
communicating a reply to the dedicated control information in the macro network between the macro access node and the user equipment, in which the reply is addressed to the TC-RNTI.

7. The method according to claim 6, in which the method is executed by the user equipment which receives the downlink common control information from the first access node and which sends to the first access node the dedicated control information about the user equipment concerning the second network.

8. The method according to claim 6, in which the method is executed by the first access node which sends the downlink common control information to the user equipment and which receives from the user equipment the dedicated control information about the user equipment concerning the second network.

9. An apparatus comprising at least one processor; and at least one memory including computer program code; in which the at least one memory and the computer program code is configured, with the at least one processor, to cause the apparatus at least to:
map from downlink common control information to an uplink resource, in which the downlink common control information is communicated in a first network between a first access node and a user equipment; and
tune to the mapped uplink resource for one of sending or receiving dedicated control information about the user equipment concerning a second network, in which the first network is a macro network, the first access node is a macro access node, the second network is an underlay network, the downlink common control information is within a downlink assignment which is indicated by at least one of a paging radio network temporary identifier P-RNTI, a random access radio network temporary identifier RA-RNTI, and a system information radio network temporary identifier SI-RNTI; and the mapping uses a control channel element which carries the P-RNTI or the RA-RNTI or the SI-RNTI.

10. The apparatus according to claim 9, in which the mapped uplink resource is a format 1a or format 1b physical uplink control channel PUCCH and the common control information requires neither an acknowledgement nor a negative acknowledgement.

11. The apparatus according to claim 9, in which the second network comprises a closed subscriber group network and the dedicated control information comprises information about interference experienced by the user equipment with the second network.

12. The apparatus according to claim 9, in which the apparatus comprises the user equipment which receives the downlink common control information from the first access node and which sends to the first access node the dedicated control information about the user equipment concerning the second network.

13. The apparatus according to claim 9, in which the apparatus comprises the first access node which sends the downlink common control information to the user equipment and which receives from the user equipment the dedicated control information about the user equipment concerning the second network.

14. An apparatus comprising at least one processor; and at least one memory including computer program code; in which the at least one memory and the computer program code is configured, with the at least one processor, to cause the apparatus at least to:
map from downlink common control information to an uplink resource, in which the downlink common control information is communicated in a first network between a first access node and a user equipment;
tune to the mapped uplink resource for one of sending or receiving dedicated control information about the user equipment concerning a second network;
map the uplink resource to a temporary cell radio network temporary identifier TC-RNTI according to a predefined algorithm; and communicate a reply to the dedicated control information in the first network between the first access node and the user equipment, in which the reply is addressed to the TC-RNTI.

15. The apparatus according to claim 14, in which the apparatus comprises the user equipment which receives the downlink common control information from the first access node and which sends to the first access node the dedicated control information about the user equipment concerning the second network.

16. The apparatus according to claim 14, in which the apparatus comprises the first access node which sends the downlink common control information to the user equipment and which receives from the user equipment the dedicated control information about the user equipment concerning the second network.

17. A memory tangibly storing a computer program that is executable by at least one processor, in which the computer program comprises:
  code for mapping from downlink common control information to an uplink resource, in which the downlink common control information is communicated in a first network between a first access node and a user equipment; and
  code for tuning to the mapped uplink resource for one of sending or receiving dedicated control information about the user equipment concerning a second network, in which the first network is a macro network, the first access node is a macro access node, the second network is an underlay network, the downlink common control information is within a downlink assignment which is indicated by at least one of a paging radio network temporary identifier P-RNTI, a random access radio network temporary identifier RA-RNTI, and a system information radio network temporary identifier SI-RNTI; and the mapping uses a control channel element which carries the P-RNTI or the RA-RNTI or the SI-RNTI.

18. The memory according to claim 17, in which the mapped uplink resource is a format 1a or format 1b physical uplink control channel PUCCH and the common control information requires neither an acknowledgement nor a negative acknowledgement.

19. The memory according to claim 17, in which the second network comprises a closed subscriber group network and the dedicated control information comprises information about interference experienced by the user equipment with the second network.

20. A memory tangibly storing a computer program that is executable by at least one processor, in which the computer program comprises:
  code for mapping from downlink common control information to an uplink resource, in which the downlink common control information is communicated in a first network between a first access node and a user equipment;
  code for tuning to the mapped uplink resource for one of sending or receiving dedicated control information about the user equipment concerning a second network;
  code mapping the uplink resource to a temporary cell radio network temporary identifier TC-RNTI according to a predefined algorithm; and
  code for communicating a reply to the dedicated control information in the first network between the first access node and the user equipment, in which the reply is addressed to the TC-RNTI.

21. The memory according to claim 20, in which the memory is embodied in the user equipment which receives the downlink common control information from the first access node and which sends to the first access node the dedicated control information about the user equipment concerning the second network.

22. The memory according to claim 20, in which the memory is embodied in the first access node which sends the downlink common control information to the user equipment and which receives from the user equipment the dedicated control information about the user equipment concerning the second network.

* * * * *